US012570556B2

(12) United States Patent
Murugesan et al.

(10) Patent No.: US 12,570,556 B2
(45) Date of Patent: Mar. 10, 2026

(54) SELECTIVE LITHIUM EXTRACTION CHEMISTRY FOR GEOTHERMAL BRINE

(71) Applicant: Baker Hughes Oilfield Operations LLC, Houston, TX (US)

(72) Inventors: Sankaran Murugesan, Katy, TX (US); Mary Jane Legaspi Felipe, Sugar Land, TX (US); Jerry J. Weers, Richmond, TX (US); Onome Ugono, Rosenberg, TX (US); Kekeli A. Ekoue-Kovi, Rosenberg, TX (US); Sai Reddy Pinappu, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 1136 days.

(21) Appl. No.: 17/538,858

(22) Filed: Nov. 30, 2021

(65) Prior Publication Data

US 2023/0166992 A1 Jun. 1, 2023

(51) Int. Cl.

| | |
|---|---|
| ***C02F 1/68*** | (2023.01) |
| ***C02F 1/44*** | (2023.01) |
| ***C02F 101/10*** | (2006.01) |
| ***C22B 26/12*** | (2006.01) |

(52) U.S. Cl.

CPC ................ *C02F 1/683* (2013.01); *C02F 1/44* (2013.01); *C02F 1/68* (2013.01); *C22B 26/12* (2013.01); *C02F 2101/10* (2013.01)

(58) Field of Classification Search

None

See application file for complete search history.

(56) References Cited

U.S. PATENT DOCUMENTS

| | | | | |
|---|---|---|---|---|
| 5,441,861 | A | 8/1995 | Weber et al. | |
| 11,912,591 | B2 * | 2/2024 | Mcdonald | B01D 61/461 |
| 2016/0228795 | A1 * | 8/2016 | St. John | C02F 1/04 |
| 2020/0165699 | A1 | 5/2020 | Snydacker et al. | |
| 2020/0230591 | A1 | 7/2020 | Snydacker | |
| 2020/0384454 | A1 | 12/2020 | Wang et al. | |
| 2021/0095122 | A1 | 4/2021 | Freeman et al. | |
| 2023/0219919 | A1 * | 7/2023 | Gluckman | B01J 20/3255 423/179.5 |
| 2023/0415122 | A1 * | 12/2023 | Kogan | B01J 20/3219 |

FOREIGN PATENT DOCUMENTS

| | | | | |
|---|---|---|---|---|
| WO | WO-2020131964 A1 * | 6/2020 | | B01J 20/3255 |

OTHER PUBLICATIONS

EnergyX; Welcome to 21st Century Lithium Production; https://energyx.com/technology/; 7p.

EnergyX; What is LiTAS ?; https://energyx.com/resources/what-is-litas/; 3 p.

Green Car Congress Newsletter; "Lithium producer Orocobre working with EnergyX on direct extraction technology", https://www.greencarcongress.com/2020/08/20200802-energyx.html; Aug. 2020; 11p.

Mashtalir, Olha; et al., "High-Purity Lithium Metal Films from Aqueous Mineral Solutions"; ACS Omega, 2018, 3, 7p.

Lee, Yongji; et al., "Lithium separation by growth of lithium aluminum layered double hydroxides on aluminum metal substrates", Solid States Sciences, 110; 2020, 10p.

Bae, Hyuntae, "Study of mechanisms and efficiencies of electrochemical lithium recycling system", Doctoral Thesis, Ulsan National Institute of Science and Technology; Sep. 2021, 116p.

GMAR; Soumaya, et al., "Recent advances on electrodialysis for the recovery of lithium from primary and secondary resources", Hydrometallurgy; Nov. 2019.

Li, Xianhui, et al. "Membrane-based technologies for lithium recovery from water lithium resources: A review"; Journal of Membrane Science; Dec. 2019.

"Membrane-based Technologies for Lithium Recovery" Image: https://ars.els-cdn.com/content/image/1-s2.0-S037673881930095X-fx1_lrg.jpg; date unknown; 1 p.

Xu, Shanshan, et al., "Extraction of Lithium from Chinese salt-lake brines by membranes: Design and practice", Journal of Membrane Science; May 2021; 22 p.

Razmjou; Amir, et al., "Lithium ion-selective membrane with 2D subnanometer channels", Water Research; May 2019; 11p.

Yu; Ping; et al., "Determination of the Lithium Ion Diffusion Coefficient in Graphite"; Univ. SC, Scholar Commons, Dept. of Chem. Eng.; 1999; 8p.

Torres, Walter R., et al., "Lithium carbonate recovery from brines using membrane electrolysis"; Journal of Membrane Science; Jun. 2020; 10 p.

Jiaqi, Huang; et al., "Review on Advanced Functional Separators for Lithium-Sulfur Batteries"; ACTA Chimica Sinica; 2017; 16p.

Jang; Jooyoung; et al., 'A Review of Functional Separators for Lithium Metal Battery Applications, Materials, 2020; 37 p.

Li; Ao, et al., "A Review on Lithium-Ion Battery Separators towards Enhanced Safety Performances and Modelling Approaches"; Modeling; Jan. 2021; 15p.

Warren, Ian; NREL "Techno-Economic Analysis of Lithium Extraction from Geothermal Brines"; National Renewable Energy Laboratory; 2021; 48p.

Seip; Adam, et al.; "Lithium recovery from hydraulic fracturing flowback and produced water using a selective ion exchange sorbent"; Chemical Engineering Journal; Jun. 2021; 13p.

Pode, Gayatri; "Direct Electrolysis of Lithium on Copper"; A Thesis Presented in Partial Fulfillment of the Requirements for the Degree Master of Science, May 2019; 41p.

Huan, Li, et al., "Recovery of lithium from mineral resources: State-of-the-art and perspectives—A review"; Hydrometallurgy; Aug. 2019; 17p.

Examination Report No. 1 dated Aug. 8, 2024 for Australian Patent Application No. 2022401545.

(Continued)

*Primary Examiner* — John J Figueroa

(74) *Attorney, Agent, or Firm* — Crowe & Dunlevy, P.C.

(57) ABSTRACT

A method for selective extraction of lithium from geothermal brines using host-guest complexes of host molecules such as calixarene, dendrimeric polymers, hyper-branched polymers, and/or acid-catalyzed resins complexed with synergists such as organic acids, condensation polymers, olefin/maleic anhydride copolymers, and/or chelants.

20 Claims, No Drawings

(56) References Cited

OTHER PUBLICATIONS

Kurniawan, Y. S., et al., "New concept for the study of the fluid dynamics of lithium extraction using calix[4]arene derivatives in T-type microreactor systems", Separations, May 20, 2021, vol. 8, Article-No. 70 (internal pp. 1-13).
Liu, W. , et al., "Extraction of lithium ions from acidic solution using electrochemically imprinted membrane", Desalination, 2020, vol. 496, Article-No. 114751 (internal pp. 1-8).
Stringfellow, W. T., et al., "Technology for the recovery of lithium from geothermal brines", Energies, Oct. 18, 2021, vol. 14, Article-No. 6805 (internal pp. 1-72).
International Search Report and Written Opinion issued in corresponding application PCT/US2022/051429 on Apr. 14, 2023.
Canadian Examination Report dated Jun. 19, 2025 for 3,238,809 CA.
Canadian Examination Report dated Jun. 25, 2024 for 3,238,809 CA.
Examination Report No. 2 dated Sep. 17, 2024 for Australian Patent Application No. 2022401545.

* cited by examiner

SELECTIVE LITHIUM EXTRACTION CHEMISTRY FOR GEOTHERMAL BRINE

TECHNICAL FIELD

The present invention relates to methods for extracting lithium from fluids, and more particularly relates to methods for selectively extracting lithium from geothermal brines.

BACKGROUND

Demand for lithium has increased exponentially due to the burgeoning electric vehicle market and increased demand for rechargeable batteries for all manner of electronic devices. The market for electric vehicles alone is about 3.3 billion US$ in 2020.

Conventional lithium extraction is mainly from hard rock mining and underground brine. These processes take from a few months to a few years to produce lithium salts by evaporation processes. These evaporation processes can adversely affect the environment by releasing $CO_2$ and by water contamination. Further, the evaporation processes are followed by extensive technological techniques that involve special handling.

More modern processes including reverse osmosis and nanofiltration are unworkable for various reasons. Reverse osmosis methods can separate all the ions out of water but are not selective, such as for lithium. Nanofiltration techniques can selectively separate ions, but cannot operate in high salinity environments (over 10% salinity) without dilution with freshwater. Other processes such as some forms of ion sorption and ion exchange cannot operate at high salinity, are batch processes versus a preferred continuous process, and they require high amounts of freshwater and reagents with high power consumption.

Recently more effort has been given to geothermal brines since they may have up to 400 ppm lithium, along with other minerals. Direct lithium extraction from geothermal brine could help meet the growing demand.

It is thus desirable to improve the ability to extract lithium from liquids containing it, and in particular to selectively extract lithium from naturally occurring liquids such as geothermal brines and the like.

SUMMARY

There is provided, in one form, a method for selectively extracting lithium from geothermal brine, where the method includes contacting a geothermal brine containing lithium with a host-guest complex in an effective amount and for an effective period of time to selectively extract lithium from the geothermal brine; and thereby extracting lithium from the geothermal brine into the host-guest complex.

DETAILED DESCRIPTION

As previously mentioned, there is a global need to develop new sources of lithium for rechargeable batteries such as those used in electric vehicles, consumer electronics, and the like. It has been discovered that lithium can be selectively extracted from geothermal brine through the use of a host-guest chemistry approach. Host-guest complexes are formed from combinations of host molecules and synergists that complex therewith. In non-limiting embodiments, host molecules including calixarenes, dendrimers, and hyper-branched polymers are complexed with synergists including, but not necessarily limited to, malic acid, succinic acid, tannic acid, and other organic acids and chelants which will be further defined below. Contacting the geothermal brines containing Li with these host-guest complexes will selectively entrap the lithium ions into the host-guest complex.

Geothermal brine is defined herein as a hot, concentrated saline solution that has circulated through very hot rocks and become enriched with elements such as lithium, boron and potassium. In the context herein, the energy-intensive process of extracting lithium from solid rock is powered by naturally occurring geothermal energy.

As noted, the host-guest complexes comprise at least one type of host molecule and at least one type of guest molecule or synergist.

Suitable possibilities for the host molecule of the host-guest complex include, but are not necessarily limited to, calixarene, dendrimeric polymers, hyper-branched polymers, acid-catalyzed resins, and combinations thereof. Calixarene is a macrocycle or cyclic oligomer based on a hydroxalkylation product of a phenol and an aldehyde. They have hydrophobic cavities that can hold the smaller guest molecules or ions. In the context herein, suitable calixarenes may have from 1-8 alkyl phenolic repeating units with weight average molecular weights of from about 100 to 15,000 molecular weights ranging from about 100 g/mole (such as in the case of p-cresol) to about 1000 g/mole (e.g., p-nonyl phenol with 10 moles PO) and more.

Suitable hosts would include, but are not necessarily limited to, podands, cryptophanes, calixarenes, cyclodextrins, cavitands, and water-soluble derivatives of same. These hosts would bind the ions including Lithium ions while sequestering or encapsulating them from the bulk solution. They have cavities suitable for the encapsulation of metal ions with a hydrophilic exterior thus they can sequester the smaller guest molecules or ions. In the context herein, suitable macrocyclic hosts may have weight average molecular weights ranging from about 100 g/mole to about 1000 g/mole.

Architectured materials useful for such purposes herein include, but are not necessarily limited to, star polymers, hyperbranched polymers, and dendrimers. In non-limiting embodiments, these materials may be hyper-branched polymers, oligomers, dendrimers with acid, ester, amine, amide, and/or alcohol functional groups. Suitable star polymers, hyperbranched polymers, and dendrimers include, but are not necessarily limited to, those comprising carbon, nitrogen, oxygen, phosphorus, sulfur, and combinations thereof, and in another non-limiting embodiment, those molecules having only these atom types. Suitable weight average molecular weights for these architectured molecules range from about 100 independently to about 1500; alternatively, from about 500 independently to about 15000.

Suitable acid-catalyzed resins include, but are not necessarily limited to, alkoxylated p-t-alkyl phenol resins where the alkyl group is selected from the group consisting of methyl, ethyl, propyl, butyl, and combinations thereof. Also suitable are resins of formula (I):

(I)

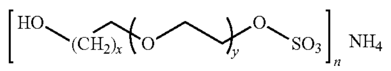

where x ranges from 1 to 12, y ranges from 1 to 300, and n is such that the weight average molecular weight ranges from about 100 to about 15000 molecular weights. Other suitable resins are those of formula (II):

(II)

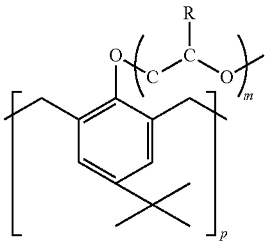

where R is hydrogen or methyl, m ranges from 1 to 100, and p ranges from 1 to 50.

A variety of molecules may be the synergist portion of the host-guest complexes. Suitable synergists include organic acid having from 1 to 7 carbon atoms, including, but not necessarily limited to, malic acid, succinic acid, tannic acid, glucaric acid, gluconic acid, tartaric acid, and combinations thereof. Suitable synergists may also include, but not necessarily be limited to condensation polymers that are reaction products of:

at least one alkyl phenol having from 1 to 30 carbon atoms, at least one aldehyde having from 1 to 4 carbon atoms, in one non-limiting embodiment, formaldehyde, and at least one polyamine of the general formula (III):

$$R^{11}R^{12}N(R^{13}NR^{14})_zNR^{15}R^{16} \quad \text{(III)}$$

where $R^{11}$, $R^{12}$, $R^{15}$, and $R^{16}$ are independently hydrogen or C1-C4 alkyl and $R^{13}$ and $R^{13}$ are independently $-(CH_2)_q-$ where q ranges from 1-6 and where z ranges from 1 to 5; where a specific non-limiting example is ethylenediamine (EDA).

Specific suitable synergists/chelants are Mannich base resins that are condensation polymers of alkyl phenol, formaldehyde and EDA that have the following structures: The structure below shows the condensation polymer of p-nonyl phenol, formaldehyde and ethylene diamine. Other polyamines, alkyl phenols and aldehyde such as acetaldehyde or benzaldehyde can be used.

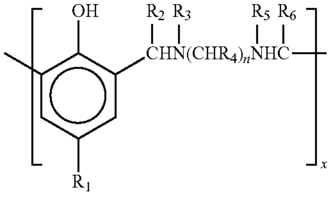

$R_1=C_{1-30}$, $R_2$, $R_3$, $R_4$, $R_5$, $R_6$=independently H, $C_{1-6}$ alkyl, aryl X=2-10 n=2-10

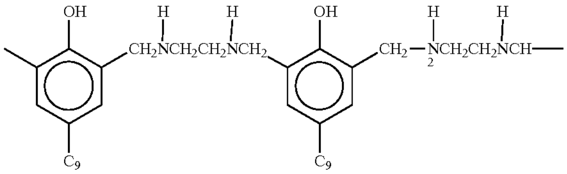

Other suitable synergists are olefin/maleic anhydride copolymers having the formula (IV):

(IV)

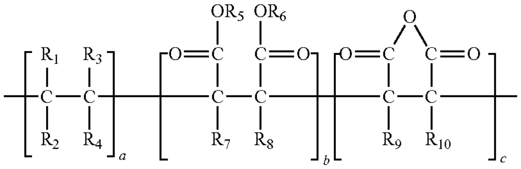

where $R_1$, $R_2$, $R_3$, and $R_4$ are independently hydrogen, C1-C30 straight chain or branched alkyl; $R_7$, $R_8$, $R_9$, $R_{10}$ are independently hydrogen, hydroxyl or C1-C4 alkyl; $R_5$ and $R_6$ are independently hydrogen, C1-C30 branched or straight chain alkyl; and a, b, and c are independently 0 to 100 where at least two of a, b, and c are each at least 1. The olefin/maleic copolymers may also be esterified and/or hydrolyzed and still be suitable synergists.

Suitable chelants also include, but are not necessarily limited to, phosphonic acid and its esters, phosphoric acid and its esters, amino phosphonates, polycarboxylic acids and their esters, ethylenediaminetetraacetic acid (EDTA) derivatives chelants, succinic acids, malic acids, sulfosuccinic acids and their esters, citric acid-based chelants, oxalic acid and its esters; and combinations thereof.

The method of claim 1 where the molar ratio of synergist to the host molecule in the host-guest complex ranges from 1:1 independently to about 0.001:1; alternatively, from about 0.01:1 independently to about 0.1:1.

The effective amount of host-guest complex in the geothermal brine is a mole ratio ranging from about 0:001:1 independently to about 100:1 based on the moles of lithium in the geothermal brine; alternatively, from about 0.01 to about 10:1. The term "independently" as used herein with respect to a range means that any threshold may be used together with another threshold to give a suitable alternative range. For example, in this case a mole ratio of from 0.001:1 to 10:1 would be a suitable alternative mole ratio.

Similarly, the amount of synergist in the geothermal brine is a mole ratio ranging from about 0:001:1 independently to about 100:1 based on the moles of lithium in the geothermal brine; alternatively, from about 0.01 to about 10:1.

In an alternative embodiment of the method described herein, the host-guest complex is incorporated into a porous membrane. Membrane development may include, but is not necessarily limited to:

1. Selected chemistry is blended/incorporated into a polymer matrix. The matrix may comprise a polymer including, but not necessarily limited to, polyimides, polyvinylacetate, polyethers, polysulphones, polypyrrole, polythiophenes, polyacetylenes, derivatized perfluoro alkylated polymers, polyamides, and combinations thereof.
2. Addition of a conducting medium into the polymer matrix, which medium may include, but is not necessarily limited to, bucky paper, graphite, exfoliated graphite, functionalized graphite, metal-doped graphite, carbon nanotubes, nanofibers, nanosheets, functionalized carbon nanoparticles, crosslinked carbon nanotubes, fiber mats, quantum dots doped with heteroatoms selected from the group consisting of nitrogen, phosphorus, boron, and combinations thereof. The fiber in the fiber mats may include, but are not necessarily limited to, carbon, graphite, carbon nanotubes, graphene and graphene oxide fibers, glass microfibers, polymer fibers. The metals in the metal-doped graphite may include, but are not necessarily be limited to sodium and potassium.

3. Incorporate a plasticizer to facilitate rolling the polymer matrix into membrane sheets. Suitable plasticizers include, but are not necessarily limited to, fatty acids, phthalates, esters, and combinations thereof.

These membranes can be coupled with known electrochemistry methods to drive the Li extraction under applied potential. Multiple membrane sheets can be arrayed in modules so that the geothermal brine would pass through multiple sheets containing host-guest complexes that would remove successive amounts of lithium ions with each membrane until substantially all of the lithium is removed.

The time period for extracting lithium from geothermal brines may range broadly from about 0.00001 day independently to about 10 days with an alternative narrow range of down to from about 0.001 minutes independently to about 100,000 min, with a narrower suitable range of from about 0.0001 seconds independently to about 1,000,000 seconds. More specifically, the time period depends on the applied potential. Additionally, potential selectivity is determined by the medium in which the dissolution is performed. For example, lithium dissolution (removal) is an anodic process, whereas deposition is a cathodic process. In the method described herein, an anodic process is used to remove lithium. The time period also depends on the environment as described in the next paragraph, and further depends on the organic solvent in which the dissolution takes place to remove the lithium. Suitable dissolution solvents include, but are not necessarily limited to organic carbonates, in another non-limiting embodiment ethylene carbonate, propylene carbonate, and/or styrene carbonate.

Lithium trapped by the host-guest complexes is removed by applying electrical potential selectively ranging from both either negative and or positive potential voltage amounts range from about 0.001 V independently to about 20 V; alternatively, in a narrow range of from about 0.01 V independently to about 10 V, with a further narrow, non-limiting range of from about 0.1 V independently to about 5 V. In one non-limiting embodiment, an anodic potential of about −200 mV could be applied when a mixture of ethylene carbonate and propylene carbonate is used. This selective anodic potential is within the ranges noted above.

Duration of applied potential may range broadly from about 0.00001 day independently to about 10 days with an alternative narrow range of down to from about 0.001 minutes independently to about 100,000 min, with a narrower suitable range of from about 0.0001 seconds independently to about 1,000,000 seconds.

Temperature of the system may suitably range from about −20° C. independently to about 100° C. alternatively in a narrow range of from about 5° C. independently to about 80° C.

The invention will be further described with respect to the following Examples, which are not meant to limit the invention, but rather to further illustrate some embodiments.

EXAMPLES

In the following examples the host molecule was calixarene and the synergist was malic acid. The mole ratio of malic acid to calixarene was about 1:1. The low concentration of host molecule was 0.1 moles calixarene to moles Li present and the high concentration was 0.3 moles calixarene to moles Li present.

TABLE 1

Intensity Demonstrating Potential Li Removal

| Ex. | Material | | Absorption (nm) | Intensity |
|---|---|---|---|---|
| 1 | Host | | 415 | 0.705 |
| 2 | Li + Synergist | | 415 | 0.095 |
| 3 | Host + Li + Synergist | Conc. 1 (low concertation) | 420 | 0.123 |
| 4 | Host + Li + Synergist | Conc.2 (high concentration) | 455 | 0.016 |

Intensity may indicate a successful host-synergist Li removal process. "Intensity" refers to the measurement of electromagnetic radiation with spectral light from 200 to 1000 nm having at absorption specific wavelength. Comparing the intensity Ex. 1 of 0.705 with the intensities of Examples 3 and 4 at 0.123 and 0.016, respectively, suggests that the intensity decreases are possibly due to the host interaction with Li and subsequent removal from the geothermal brine, and that at high concentration the Li removal is synergistic.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, host molecules, synergists, calixarenes, polymers, copolymers, acid-catalyzed resins, organic acids, alkyl phenols, aldehydes, polyamines, olefin/maleic anhydride copolymers, chelants, geothermal brines, compositions, proportions, molar ratios and amounts not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, the method for selectively extracting lithium from geothermal brine may comprise, consist essentially of, or consist of contacting a geothermal brine containing lithium with a host-guest complex in an effective amount and for an effective period of time to selectively extract lithium from the geothermal brine; and extracting lithium from the geothermal brine into the host-guest complex. The host molecules and the synergists may comprise, consist essentially of, or consist of any of the species recited in the claims.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for selectively extracting lithium from geothermal brine, the method comprising:

contacting a geothermal brine containing lithium with a host-guest complex in an effective amount and for an effective period of time to selectively extract lithium from the geothermal brine, where the host-guest complex comprises a calixarene host molecule; and extracting lithium from the geothermal brine into the host-guest complex.

2. The method of claim 1, wherein the host-guest complex further comprises an acid-catalyzed resin selected from the group consisting of:

alkoxylated p-t-alkyl phenol resins where the alkyl group is selected from the group consisting of methyl, ethyl, propyl, butyl, and combinations thereof;

resins of formula (I):

(I)

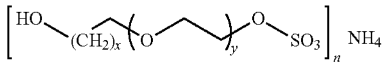

where x ranges from 1 to 12, y ranges from 1 to 300, and n is such that the weight average molecular weight ranges from about 100 to about 15,000;

resins of formula (II):

(II)

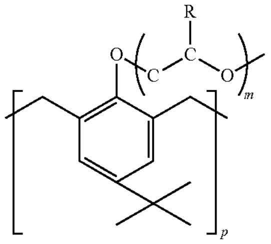

where R is hydrogen or methyl, m ranges from 1 to 100, and p ranges from 1 to 50.

3. The method of claim 1 where the host-guest complex comprises a synergist, wherein the synergist is an organic acid having from 1 to 7 carbon atoms.

4. The method of claim 3 where the organic acid is selected from the group consisting of malic acid, succinic acid, tannic acid, glucaric acid, gluconic acid, tartaric acid, and combinations thereof.

5. The method of claim 1 where the host-guest complex comprises a host molecule and a synergist and the molar ratio of synergist to the host molecule in the host-guest complex ranges from 1:1 to about 0.001:1.

6. The method of claim 1 where the effective amount of host-guest complex is a mole ratio ranging from about 0:001:1 to about 100:1 based on the moles of lithium in the geothermal brine.

7. The method of claim 1 where the host-guest complex is incorporated into a porous membrane.

8. The method of claim 7 where the membrane comprises:

a membrane matrix comprising a polymer selected from the group consisting of polyimides, polyvinylacetate, polyethers, polysulphones, polypyrrole, polythiophenes, polyacetylenes, derivatized perfluoroalkylated polymers, polyamides, and combinations thereof;

a conducting medium selected from the group consisting of bucky paper, graphite, exfoliated graphite, functionalized graphite, metal-doped graphite, carbon nanotubes, nanofibers, nanosheets, functionalized carbon nanoparticles, crosslinked carbon nanotubes, fiber mats, quantum dots doped with heteroatoms selected from the group consisting of nitrogen, phosphorus, boron, and combinations thereof; and a plasticizer selected from the group consisting of fatty acids, phthalates, esters, and combinations thereof.

9. The method of claim 1 where contacting the geothermal brine with the host-guest complex comprises additionally contacting the geothermal brine with an organic carbonate effective for lithium dissolution, and the method further comprises application of an anodic potential.

10. A method for selectively extracting lithium from geothermal brine, the method comprising:

contacting a geothermal brine containing lithium with a host-guest complex in an effective amount and for an effective period of time to selectively extract lithium from the geothermal brine, where:

the host-guest complex comprises a calixarene host molecule; and the host-guest complex comprises a synergist, wherein the synergist is an organic acid having from 1 to 7 carbon atoms; and extracting lithium from the geothermal brine into the host-guest complex.

11. The method of claim 10 wherein the host-guest complex further comprises an acid-catalyzed resin selected from the group consisting of:

alkoxylated p-t-alkyl phenol resins where the alkyl group is selected from the group consisting of methyl, ethyl, propyl, butyl, and combinations thereof;

resins of formula (I):

(I)

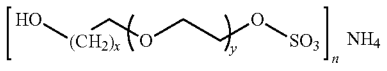

where x ranges from 1 to 12, y ranges from 1 to 300, and n is such that the weight average molecular weight ranges from about 100 to about 15,000;

resins of formula (II):

(II)

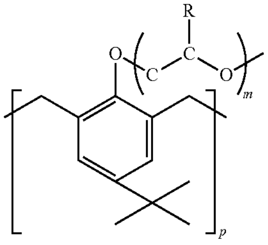

where R is hydrogen or methyl, m ranges from 1 to 100, and p ranges from 1 to 50.

12. The method of claim 10 where the synergist is an organic acid selected from the group consisting of malic acid, succinic acid, tannic acid, glucaric acid, gluconic acid, tartaric acid, and combinations thereof.

13. The method of claim 10 where the host-guest complex comprises a host molecule and a synergist and the molar ratio of synergist to the host molecule in the host-guest complex ranges from 1:1 to about 0.001:1.

14. The method of claim 10 where the effective amount of host-guest complex is a mole ratio ranging from about 0:001:1 to about 100:1 based on the moles of lithium in the geothermal brine.

15. The method of claim 10 where the host-guest complex is incorporated into a porous membrane.

16. The method of claim 15 where the membrane comprises:

a membrane matrix comprising a polymer selected from the group consisting of polyimides, polyvinylacetate, polyethers, polysulphones, polypyrrole, polythiophenes, polyacetylenes, derivatized perfluoroalkylated polymers, polyamides, and combinations thereof;

a conducting medium selected from the group consisting of bucky paper, graphite, exfoliated graphite, functionalized graphite, metal-doped graphite, carbon nanotubes, nanofibers, nanosheets, functionalized carbon nanoparticles, crosslinked carbon nanotubes, fiber mats, quantum dots doped with heteroatoms selected from the group consisting of nitrogen, phosphorus, boron, and combinations thereof; and a plasticizer selected from the group consisting of fatty acids, phthalates, esters, and combinations thereof.

17. A method for selectively extracting lithium from geothermal brine, the method comprising:

contacting a geothermal brine containing lithium with a host-guest complex in an amount of host-guest complex of a mole ratio ranging from about 0:001:1 to about 100:1 based on the moles of lithium in the geothermal brine, and for an effective period of time to selectively extract lithium from the geothermal brine, where:

the host-guest complex comprises a calixarene host molecule; and the host-guest complex comprises a synergist, wherein the synergist is an organic acid having from 1 to 7 carbon atoms;

where the molar ration of synergist to the host molecule in the host-guest complex ranges from 1:1 to about 0.001:1; and extracting lithium from the geothermal brine into the host-guest complex.

18. The method of claim 17 where the host-guest complex further comprises an acid-catalyzed resin selected from the group consisting of:

alkoxylated p-t-alkyl phenol resins where the alkyl group is selected from the group consisting of methyl, ethyl, propyl, butyl, and combinations thereof;

resins of formula (I):

(I)

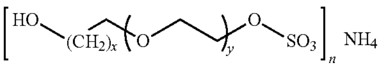

where x ranges from 1 to 12, y ranges from 1 to 300, and n is such that the weight average molecular weight ranges from about 100 to about 15,000;

resins of formula (II):

(II)

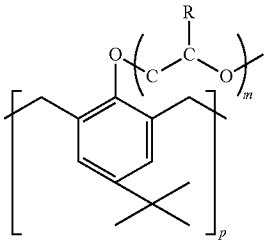

where R is hydrogen or methyl, m ranges from 1 to 100, and p ranges from 1 to 50.

19. The method of claim 17 where the synergist is an organic acid selected from the group consisting of malic acid, succinic acid, tannic acid, glucaric acid, gluconic acid, tartaric acid, and combinations thereof.

20. A method for selectively extracting lithium from geothermal brine, the method comprising:

contacting a geothermal brine containing lithium with a host-guest complex in an effective amount and for an effective period of time to selectively extract lithium from the geothermal brine, where contacting the geothermal brine with the host-guest complex comprises additionally contacting the geothermal brine with an organic carbonate effective for lithium dissolution; and extracting lithium from the geothermal brine into the host-guest complex, wherein the method further comprises application of an anodic potential.

* * * * *